United States Patent
Gibbons, Jr. et al.

(10) Patent No.: US 6,824,470 B2
(45) Date of Patent: Nov. 30, 2004

(54) BI-DIRECTION TORQUE-LIMITING INTERFACE

(75) Inventors: Donald G. Gibbons, Jr., Wake Forest, NC (US); Jackie C. Sullivan, Wendell, NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 10/274,764

(22) Filed: Oct. 21, 2002

(65) Prior Publication Data

US 2004/0077410 A1 Apr. 22, 2004

(51) Int. Cl.[7] ................................................. F16D 3/52
(52) U.S. Cl. ...................................................... 464/57
(58) Field of Search .............................. 464/30, 40, 57, 464/60; 74/523, 543, 548; 192/56.2; 379/366, 367

(56) References Cited

U.S. PATENT DOCUMENTS

| | | | | |
|---|---|---|---|---|
| 1,864,716 A | * | 6/1932 | Doremus | 464/30 X |
| 2,864,923 A | * | 12/1958 | Mathews | 200/336 X |
| 3,558,165 A | * | 1/1971 | Lundergan | 74/553 X |
| 3,718,009 A | * | 2/1973 | Perina | 464/30 |
| 4,194,605 A | * | 3/1980 | Sessa | 464/40 X |
| 5,890,393 A | * | 4/1999 | Ohta | 464/57 X |

FOREIGN PATENT DOCUMENTS

GB    2 135 754 A   *   9/1984     464/57

* cited by examiner

Primary Examiner—Greg Binda

(57) ABSTRACT

A bi-directional torque-limiting interface for rotary operating devices is shown and described. The interface includes a first section receiving torque from a source, a second section delivering the received torque to a rotary operating device and a coupler operably connecting the first and second sections. The coupler is preloaded to a predetermined value and maintains a particular angular relationship between the first and second sections under normal operating conditions.

5 Claims, 3 Drawing Sheets

BI-DIRECTION TORQUE-LIMITING INTERFACE

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to rotational mechanical operators, and particularly to a bi-directional torque-limiting interface.

BRIEF DESCRIPTION OF THE DRAWINGS

The features of the invention will become more clearly understood from the following detailed description of the invention read together with the drawings in which.

Figure 1:
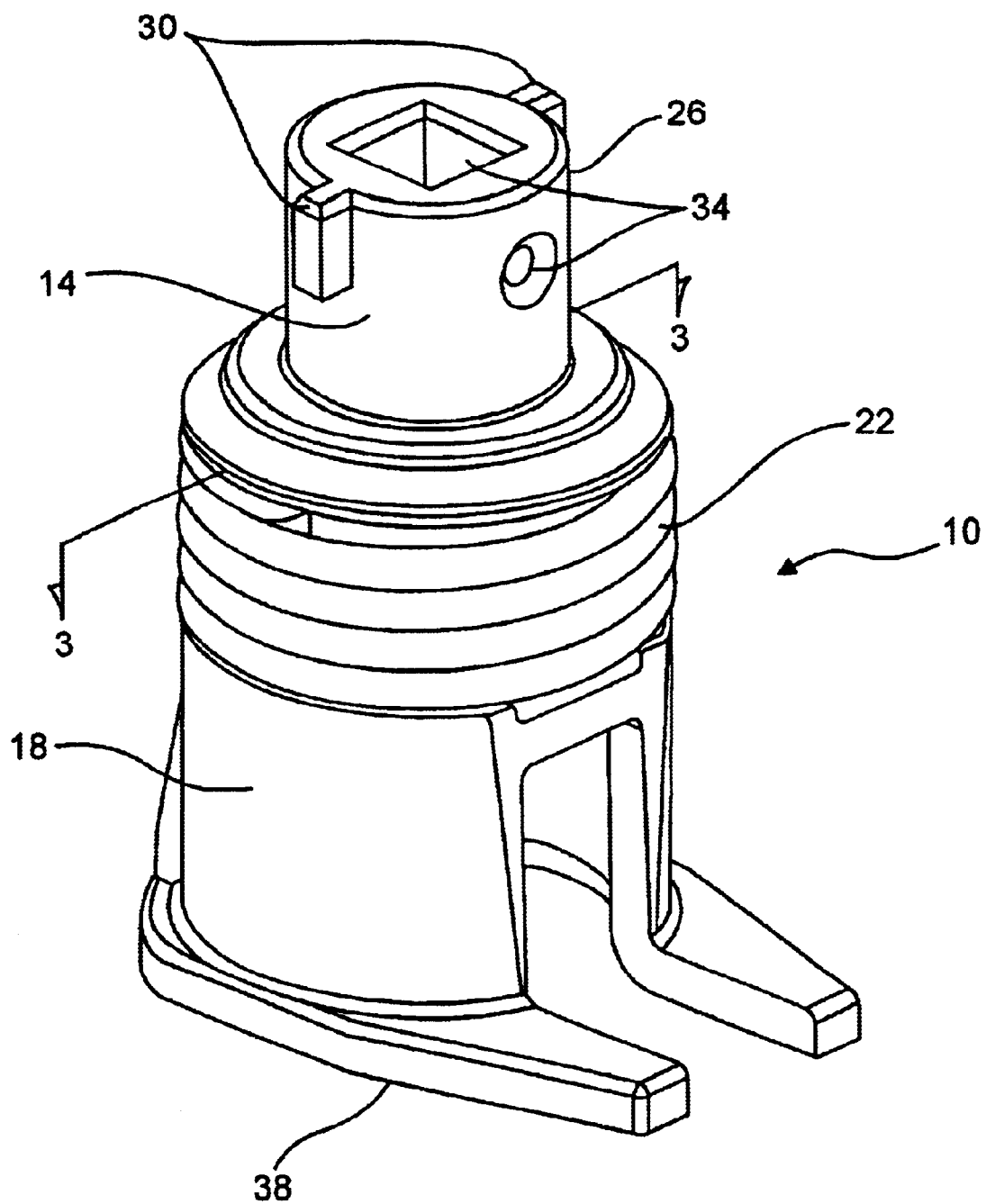
FIG. 1 is an isometric view of a bi-directional torque-limiting interface manufactured in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a bi-directional torque-limiting interface manufactured in accordance with the present invention and generally indicated by reference numeral 10. The interface 10 includes a first section 14 for imparting a torque, a second section 18 for receiving the imparted torque and a bi-directional torque-limiting coupler 22, operably connecting the first section 14 and second section 18. The first section 14 has a first end, generally indicated by reference numeral 26, configured by ribs 30, apertures 34 or other mating means, for operably engaging a first rotatable or torque producing device such as an operating handle or a shaft (not shown). The second section 18 has a first end, generally indicated by reference numeral 38, configured for operably engaging a second rotatable or operated device such as an electrical switch (not shown), which is to be operated by the operating handle and which can sustain damage from an over-torque condition.

Figure 2:
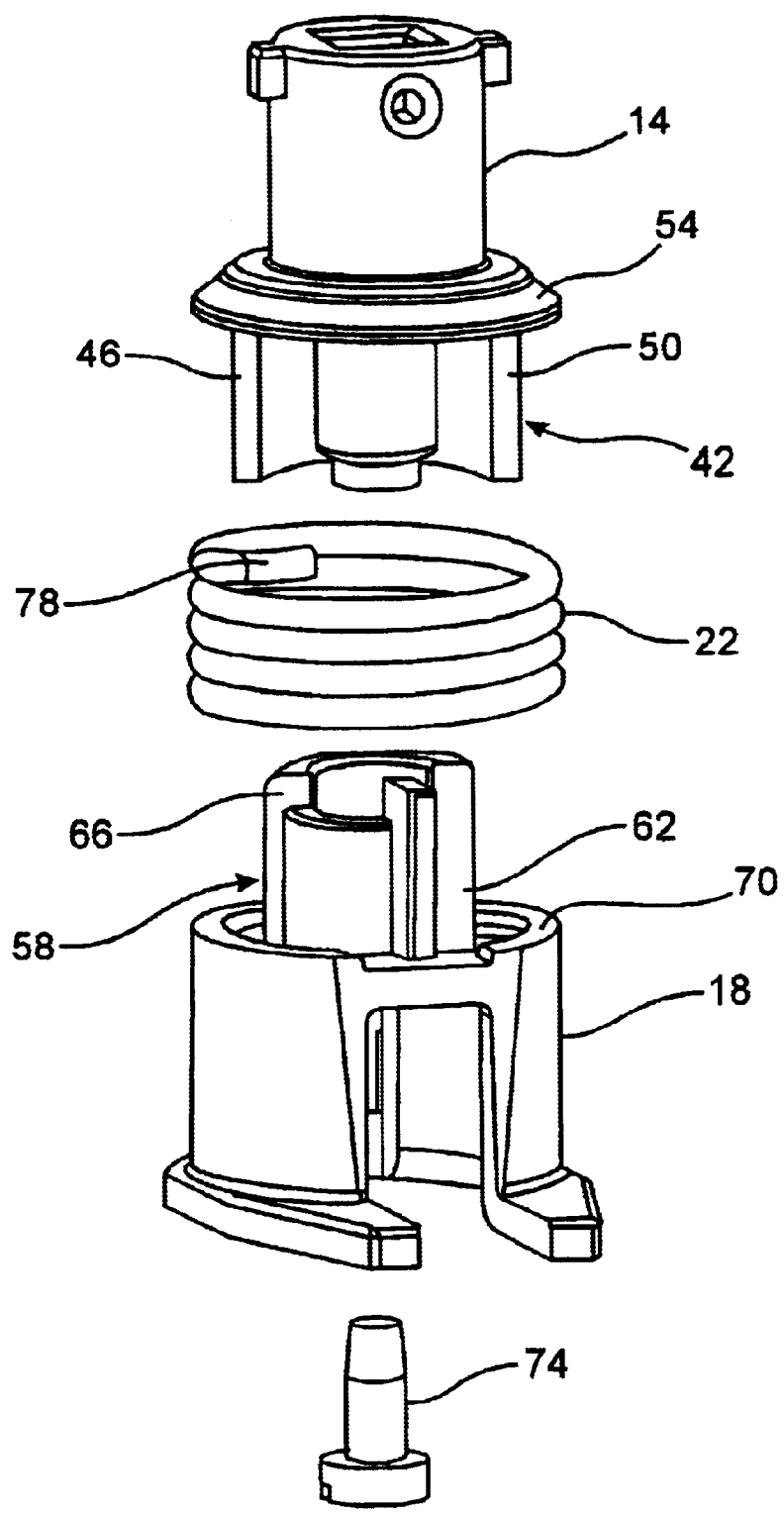
FIG. 2 is an isometric exploded view of a bi-directional torque-limiting interface of FIG. 1.

FIG. 2, illustrates, in exploded view, the bi-directional torque-limiting interface 10 of FIG. 1. The first section 14 defines a second end, generally indicated by reference numeral 42, which further defines a first torque imparting surface 46 and a second torque imparting surface 50 and a cap 54. The second section 18 also defines a second end, generally indicated by reference numeral 58, which further defines a first torque receiving surface 62 and a second torque receiving surface 66 and a base 70. The second ends, 42 and 58, are configured for coaxial mating and, under conditions which will be discussed later, limited coaxial rotation with respect to one another. The first and second sections, 14 and 18, respectively, are held together by a fastening device 74, such as a screw, rivet, integrally molded fastener or similar means capable of permitting limited rotation between the first and second sections, 14 and 18. The coupler 22 is captivated between the cap 54 of the first section 14 and the base 70 of the second section 18. The coupler 22 is a biasing device, such as a coil spring, having a first engaging member 78 and a second engaging member 82 (similar to first engaging member 78 and shown in FIGS. 3A–3B). The coupler 22 is installed between the first and second sections, 14 and 18, respectively, such that a preloaded condition is maintained between the first and second torque imparting surfaces, 46 and 50, and the first and second torque receiving surfaces, 62 and 66, of the first and second sections, 14 and 18. Under normal operating conditions, the preloaded condition of the coupler 22 maintains a particular angular relationship between the first and second sections, 14 and 18, and ultimately between the operating handle and the operated device.

Figure 3A:
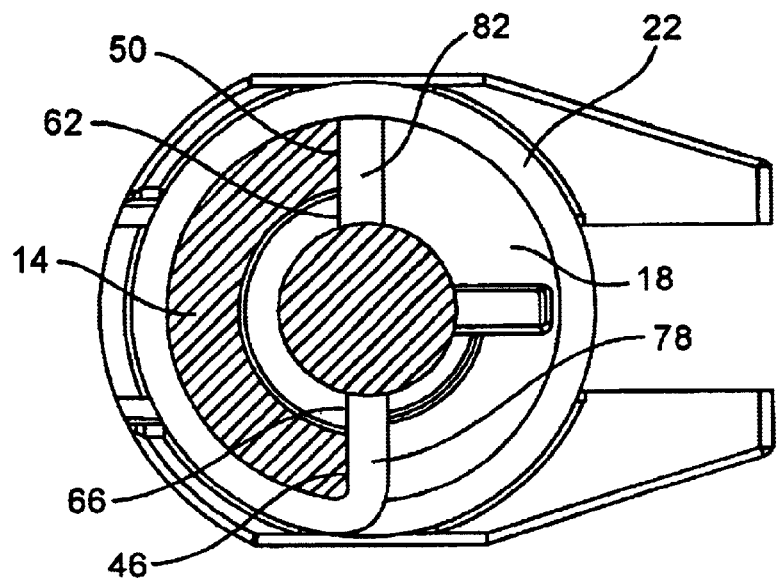
FIG. 3A, is a cross-sectional view taken along line 3—3 of FIG. 1 illustrating the relationship of components under normal operating conditions.

FIG. 3A, illustrates, in cross-section, the relationship between interacting elements of the bi-directional torque-limiting interface 10 under normal operating conditions wherein the handle either has no torque applied to it, or has a torque less than the preloaded torque of the coupler 22 applied to it. In this condition each of the first and second engaging members, 78 and 82, respectively, of coupler 22 engage one of the first and second torque imparting surfaces, 46 or 50, and one of the first and second torque receiving surfaces, 62 or 66, of first and second sections, 14 and 18, respectively, thereby maintaining a particular angular relationship between the first and second sections, 14 and 18, such that torque from the operating handle is applied directly to the operated device. The value of the preloaded torque applied between the first and second torque imparting surfaces, 46 and 50, and the first and second torque receiving surfaces, 62 and 66, by the first and second engaging members, 78 and 82, of the coupler 22, is determined by the torque required to operate the operated device under normal conditions without causing physical damage to the operated device. Therefore, the preloaded torque applied by the coupler 22 is greater than the minimum torque required to operate the operated device but less than a torque that can cause physical damage to the operated device. The particular angular relationship maintained between the first and second sections, 14 and 18, by the coupler 22 permits the operating handle to indicate the true position or state of the operated device should it become inoperable in such a manner that prohibits its rotation.

Figure 3B:
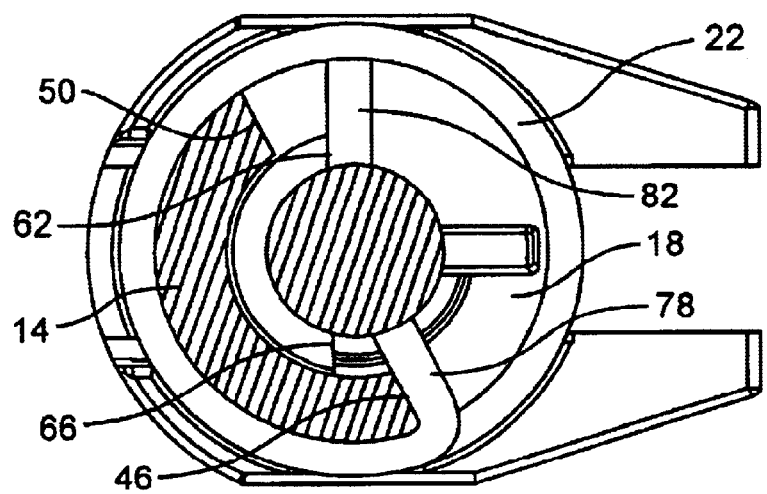
FIG. 3B, is a cross-sectional view taken along line 3—3 of FIG. 1 illustrating the relationship of components with an overtorque in the counter clockwise direction.

FIG. 3B illustrates, in cross-section, the relationship between interacting elements of the bi-directional torque-limiting interface 10 under abnormal operating conditions in which the operated device, for some reason, can not rotate. Due to the abnormal operating condition, a torque greater than the preloaded torque of the coupler 22 has been applied to the handle in an effort to rotate the operated device in the counter clockwise direction. In this condition it can be seen that the first section 14 has become angularly displaced, in the counter clockwise direction, from the second section 18, which is not permitted to rotate because of the abnormal condition of the operated device. Therefore, the torque applied to the first section 14 is greater than the preloaded torque of the coupler 22, causing the first torque imparting surface 46 to move the first engaging member 78 in a counter clockwise direction away from the second torque receiving surface 66 of the second section 18. The coupler 22 has absorbed the additional torque applied to the handle allowing the handle and first section 14 to be angularly displaced from the second section 18 and the operated device without causing damage to the operated device or the interface 10. When torque is no longer present on the handle, the elements of the interface 10 will return to the relationships as shown in FIG. 3A.

Figure 3C:
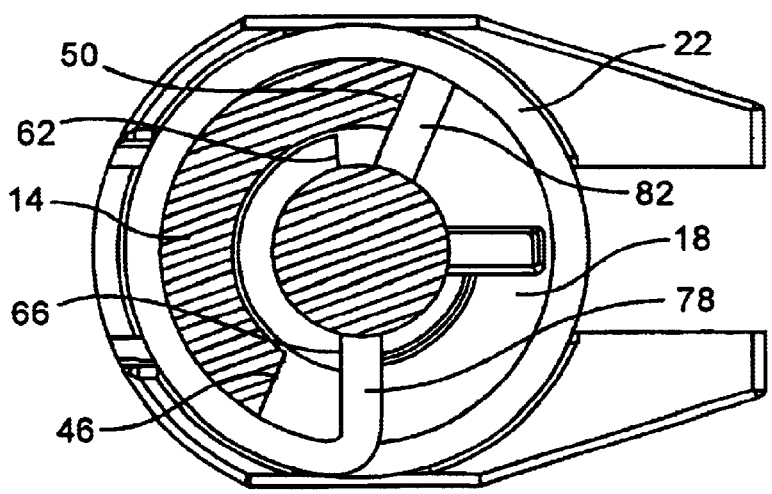
FIG. 3C, is a cross-sectional view taken along line 3—3 of FIG. 1 illustrating the relationship of components with an overtorque in the clockwise direction.

FIG. 3C illustrates, in cross-section, the relationship between interacting elements of the bi-directional torque-limiting interface 10 under the same abnormal condition of FIG. 3B except in a clockwise rotation. In this condition the first section 14 has become angularly displaced, in the clockwise direction, from the second section 18, which is not permitted to rotate because of the abnormal condition of the operated device. Therefore, the torque applied to the first section 14 is greater than the preloaded torque of the coupler 22, causing the second torque imparting surface 50 to move the second engaging member 82 in a clockwise direction away from the first torque receiving surface 62 of the second section 18. The coupler 22 has again absorbed the additional torque applied to the handle allowing the handle and first section 14 to be angularly displaced from the second section 18 and the operated device without causing damage to the operated device or the interface 10. When torque is no longer present on the handle, the elements of the interface 10 will return to the relationships as shown in FIG. 3A.

We claim:

1. An interface for selectively transmitting a rotational force applied to an operating handle to an operated device said interface comprising:

a first section-having a first end configured for engaging the operating handle and a second end defining a first torque imparting surface and a second torque imparting surface;

a second section having a first end configured for engaging the operated device and a second end defining a first torque receiving surface and a second torque receiving surface; and a bi-directional coupler defining a first engaging member operably engaging said first torque imparting surface and said first torque receiving surface and a second engaging member operably engaging said second torque imparting surface and said second torque receiving surface, said coupler being a biasing device preloaded to a predetermined value such that said predetermined value maintains a particular angular alignment between said first and said second sections when no rotational force is applied to the operating handle and when a rotational force less than said predetermined value is applied to said operating handle, said predetermined value limits the bi-directional rotational movement transmitted from said first section to said second section when the rotational force applied to the operating handle is greater than said predetermined value and returns said first and said second sections to said particular angular alignment when rotational force is removed from the operating handle.

2. The interface of claim 1, wherein said predetermined value of said pre-loaded bi-directional coupler is greater than a torque required to operate the operated device.

3. The interface of claim 1, wherein said predetermined value of said pre-loaded bi-directional coupler is less than a torque that can damage the operated device.

4. The interface of claim 1, wherein said second ends of said first and second sections are configured for coaxial alignment and a coaxial angular displacement with respect to one another.

5. The interface of claim 4, wherein said bi-directional coupler permits said coaxial angular displacement between said first and second sections as long as the rotational force applied to the operating handle exceeds said predetermined value.

* * * * *